United States Patent [19]

Egan

[11] 3,891,972

[45] June 24, 1975

[54] SYNCHRONOUS SEQUENTIAL CONTROLLER FOR LOGIC OUTPUTS

[75] Inventor: Gary L. Egan, Loveland, Colo.

[73] Assignee: Hewlett-Packard Company, Palo Alto, Calif.

[22] Filed: June 9, 1972

[21] Appl. No.: 263,741

[52] U.S. Cl. .............................................. 340/172.5
[51] Int. Cl. .............................................. G06f 9/20
[58] Field of Search .................................. 340/172.5

[56] References Cited

UNITED STATES PATENTS

| | | | |
|---|---|---|---|
| 3,387,278 | 6/1968 | Pasternak | 340/172.5 |
| 3,521,237 | 7/1970 | Chinlund | 340/172.5 |
| 3,533,075 | 10/1970 | Johnson et al. | 340/172.5 |
| 3,533,077 | 10/1970 | Bell et al. | 340/172.5 |
| 3,553,653 | 1/1971 | Krock | 340/172.5 |
| 3,555,513 | 1/1971 | Hauck et al | 340/172.5 |
| 3,559,183 | 1/1971 | Sussenguth | 340/172.5 |
| 3,566,369 | 2/1971 | Chinlund | 340/172.5 |
| 3,593,306 | 7/1971 | Toy | 340/172.5 |
| 3,651,482 | 3/1972 | Benson et al. | 340/172.5 |
| 3,689,895 | 9/1972 | Kitamura | 340/172.5 |
| 3,739,345 | 6/1973 | Janssens | 340/172.5 |

*Primary Examiner*—Gareth D. Shaw
*Assistant Examiner*—Mark Edward Nusbaum
*Attorney, Agent, or Firm*—Roland I. Griffin; William E. Hein

[57] ABSTRACT

Medium scale integrated circuits and logic gates are connected to provide sequential output instructions, responsive to a predetermined sequence of logic states contained in a decoder, and in synchronization with clock pulses.

2 Claims, 1 Drawing Figure

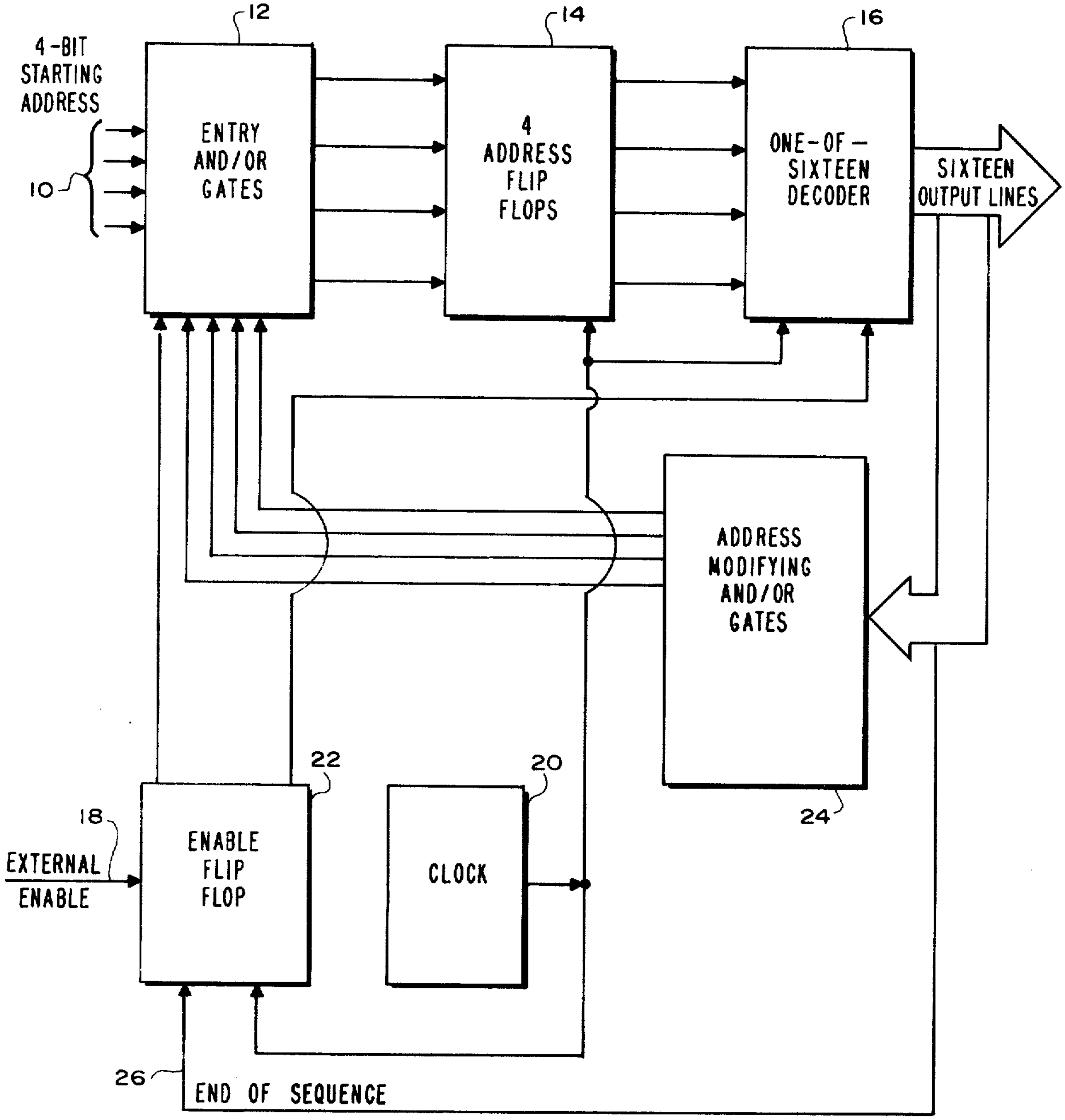
4-BIT STARTING ADDRESS
10
12
ENTRY AND/OR GATES
14
4 ADDRESS FLIP FLOPS
16
ONE-OF-SIXTEEN DECODER
SIXTEEN OUTPUT LINES
ADDRESS MODIFYING AND/OR GATES
24
22
20
18
EXTERNAL ENABLE
ENABLE FLIP FLOP
CLOCK
26
END OF SEQUENCE

SYNCHRONOUS SEQUENTIAL CONTROLLER FOR LOGIC OUTPUTS

REFERENCE TO RELATED APPLICATION

This application is related to a portion of the subject matter of copending U.S. patent application Ser. No. 153,437 entitled Improved Programmable Calculator, filed on June 15, 1971, by Robert E. Watson, Jack M. Walden, and Charles W. Near and assigned to the same assignee as the present application.

BACKGROUND AND SUMMARY OF THE INVENTION

Circuits constructed according to the prior art for synchronously executing a predetermined sequence of logic states have generally been implemented by using read-only-memory modules. However, when dealing with the problem of executing a simple routine involving, for example, 16 or fewer flow chart logic states, use of a read-only-memory of ordinary size is economically impractical. In addition, those small read-only-memory modules which may be desirable for use in such applications typically require higher operating power levels, thus resulting in excessive heat generation and a generally inefficient system. Also, fabrication time is increased since read-only-memories must generally be custom built and programmed for each particular application.

Accordingly, it is an object of this invention to provide a synchronous sequential controller for logic outputs which may be implemented without the use of read-only-memories.

This object is accomplished in accordance with the preferred embodiment of this invention by employing a plurality of AND/OR gates for receiving a starting address of a sequence of logic states to be executed. Address flip-flops select a particular output line of a one-of-16 decoder on which instructions will be issued in response to a clock enable signal. Decoder outputs are returned to another plurality of AND/OR gates for modifying the address of the previously executed logic state to the address of the next logic state to be executed.

DESCRIPTION OF THE DRAWING

The drawing is a block diagram of a synchronous sequential controller according to the preferred embodiment of the invention.

DESCRIPTION OF THE PREFERRED EMBODIMENT

Referring to the drawing, there is shown a block diagram of a synchronous sequential controller for executing a sequence of logic states comprising an input/outpout routine for a desk-top calculator such as that described in the related application cited above. A 4-bit starting address 10 is gated to four address flip-flops 14 through some entry AND/OR gates during a portion of each cycle of a clock 20 that a one-of-16 decoder 16 is disabled. The output of clock 20 is connected for enabling the address flip-flops 14 and the one-of-16 decoder 16 and also provides a clock input to an enable flip-flop 22. The combination of an external enable signal 18 and an output from clock 20 serves to enable the one-of-16 decoder and to disable the entry AND/OR gates 12. Sequential operation is achieved by connecting 16 output lines of the one-of-16 decoder 16 to the inputs of a group of address modifying AND/OR gates which serves to translate the instruction just issued on one of the output lines to the address of the next logic state to be executed. That address is then passed to the entry AND/OR gates 12 for gating to the address flip-flops 14 upon issuance of an enable signal from enable flip-flop 22. This procedure is repeated until all of the logic states of the routine have been executed. At that time an end-of-sequence signal, taken from the output line on which the last instruction of the sequence appears, is applied at an input 26 of the enable flip-flop 22 for inhibiting further sequencing. Synchronization is obtained by using the single output of clock 20 to drive enable flip-flop 22, address flip-flop 14, and the enable input of the one-of-16 decoder 16. The conventional blocks shown in the drawing and described herein may be constructed, for example, as shown in the detailed schematic diagram of FIGS. 140A–C of the earlier filed copending U.S. patent application cited above.

I claim:

1. A synchronous sequential controller for issuing a predetermined sequence of instructions, said controller comprising:

gating means for sequentially gating starting and other addresses, each of which is associated with a separate instruction;

addressing means connected to said gating means for sequentially storing each of said addresses gated by said gating means;

decoding means connected to said addressing means for decoding the one of said addresses currently stored in said addressing means and for issuing the instruction associated with that address on a corresponding one of a plurality of separate output lines of said decoding means;

address modification means connected to the output lines of said decoding means and to said gating means for directly translating each instruction issued on any of the output lines of said decoding means into the one of said addresses associated with the next instruction in said predetermined sequence to be issued and for transmitting that address to said gating means;

clock means connected to said addressing means and to said decoding means for determining the point in time at which each of said instructions is to be issued; and enabling means connected to said gating means and to said decoding means and responsive to said clock means for simultaneously enabling said decoding means and disabling said gating means.

2. A synchronous sequential controller as in claim 1 wherein:

said gating means comprises a plurality of flip-flops;

said address modification means comprises a plurality of AND/OR gates; and said enabling means comprises a flip-flop.

* * * * *